(12) United States Patent
Fuller et al.

(10) Patent No.: US 10,020,526 B2
(45) Date of Patent: Jul. 10, 2018

(54) REVERSE OSMOSIS MEMBRANES MADE WITH PFSA IONOMER AND EPTFE

(75) Inventors: Timothy J. Fuller, Pittsford, NY (US); Lijun Zou, Rochester, NY (US); Ion C. Halalay, Grosse Pointe Park, MI (US); James Mitchell, Bloomfield, NY (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1668 days.

(21) Appl. No.: 13/611,709

(22) Filed: Sep. 12, 2012

(65) Prior Publication Data

US 2014/0068927 A1    Mar. 13, 2014

(51) Int. Cl.
| | |
|---|---|
| *H01M 8/1069* | (2016.01) |
| *H01M 2/14* | (2006.01) |
| *H01M 8/1081* | (2016.01) |
| *C08K 3/16* | (2006.01) |

(52) U.S. Cl.
CPC ......... *H01M 8/1079* (2013.01); *H01M 2/145* (2013.01); *H01M 8/1081* (2013.01); *C08K 3/16* (2013.01); *Y02P 70/56* (2015.11); *Y10T 29/49108* (2015.01); *Y10T 29/49826* (2015.01)

(58) Field of Classification Search
CPC ....... Y02E 60/522; Y02E 60/521; H01M 2/18
See application file for complete search history.

(56) References Cited

U.S. PATENT DOCUMENTS

| | | | |
|---|---|---|---|
| 5,387,378 A * | 2/1995 | Pintauro et al. | 264/48 |
| 7,875,392 B2 | 1/2011 | Miyake et al. | |
| 7,888,433 B2 | 2/2011 | Fuller et al. | |
| 7,897,691 B2 | 3/2011 | MacKinnon et al. | |
| 7,897,692 B2 | 3/2011 | MacKinnon et al. | |
| 7,897,693 B2 | 3/2011 | MacKinnon et al. | |
| 8,008,404 B2 * | 8/2011 | MacKinnon et al. | 525/326.2 |
| 8,053,530 B2 | 11/2011 | Fuller et al. | |
| 2007/0092777 A1 * | 4/2007 | Zhamu et al. | 429/33 |
| 2007/0099054 A1 | 5/2007 | Fuller et al. | |
| 2011/0223486 A1 * | 9/2011 | Zhang et al. | 429/247 |
| 2012/0076990 A1 | 3/2012 | Merlo et al. | |

FOREIGN PATENT DOCUMENTS

| | | |
|---|---|---|
| CN | 1290273 A | 4/2001 |
| CN | 1388993 A | 1/2003 |
| DE | 112004001057 B4 | 6/2014 |

OTHER PUBLICATIONS

Pall Corporation technical document, no date.*

* cited by examiner

*Primary Examiner* — Alex A Rolland (57) ABSTRACT

A method for forming a membrane includes a step of dissolving a lithium salt in a solution including an ionomer that includes protogenic groups to form a modified solution. A membrane is formed from the solution containing the lithium salt and the ionomer that includes protogenic groups. The membrane is dried and then contacted with water to form a plurality of pores therein.

16 Claims, 7 Drawing Sheets

REVERSE OSMOSIS MEMBRANES MADE WITH PFSA IONOMER AND EPTFE

TECHNICAL FIELD

The invention relates to an ionomeric membrane that may be used for humidification, reverse osmosis, and battery separator application.

BACKGROUND

Ionomeric membranes are used for a number of modern applications including battery technologies, fuel cell technologies, reverse osmosis, filtration, and the like.

In battery applications, such membranes are used as separators. Battery separators are porous sheets that are interposed between an anode and cathode in a fluid electrolyte. For example, in lithium ion batteries, lithium ions ($Li^+$) move from the anode to the cathode during discharge. The battery separator acts to prevent physical contact between the electrodes while allowing ions to be transported. Typical prior art separators include microporous membranes and mats made from nonwoven cloth. Battery separators are ideally inert to the electrochemical reactions that occur in batteries. Therefore, various polymers have been used to form battery separators.

In the case of fuel cells, membranes are used as ion conductors. For example, in proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power. In order to perform well, polyelectrolyte membranes require hydration provided by the water vapor transfer, humidification membranes described herein.

Reverse osmosis membranes are used for many applications including water purification and the concentration of ethanol from aqueous alcohol mixtures. Membranes of this type are made from reconstituted cellulose which suffers from low temperature applications, biodegradation, and chemical instability.

Accordingly, the present invention provides improved methods of making membranes with graded pore sizes that are useful in filtration, humidification, battery and fuel cell applications.

SUMMARY OF THE INVENTION

The present invention solves one or more problems of the prior art by providing a method for forming a membrane. The method includes a step of dissolving a lithium salt in a solution including an ionomer that includes protogenic groups to form a modified solution. A membrane is formed from the solution containing the lithium salt and the ionomer that includes protogenic groups. The membrane is dried and then contacted with water to form a plurality of pores therein. The membranes formed from this method are useful as Li-ion battery separators in electric vehicles. Other applications include reverse osmosis, water purification, adjustment of the concentration of alcohol in aqueous-ethanol mixtures, and humidifiers.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
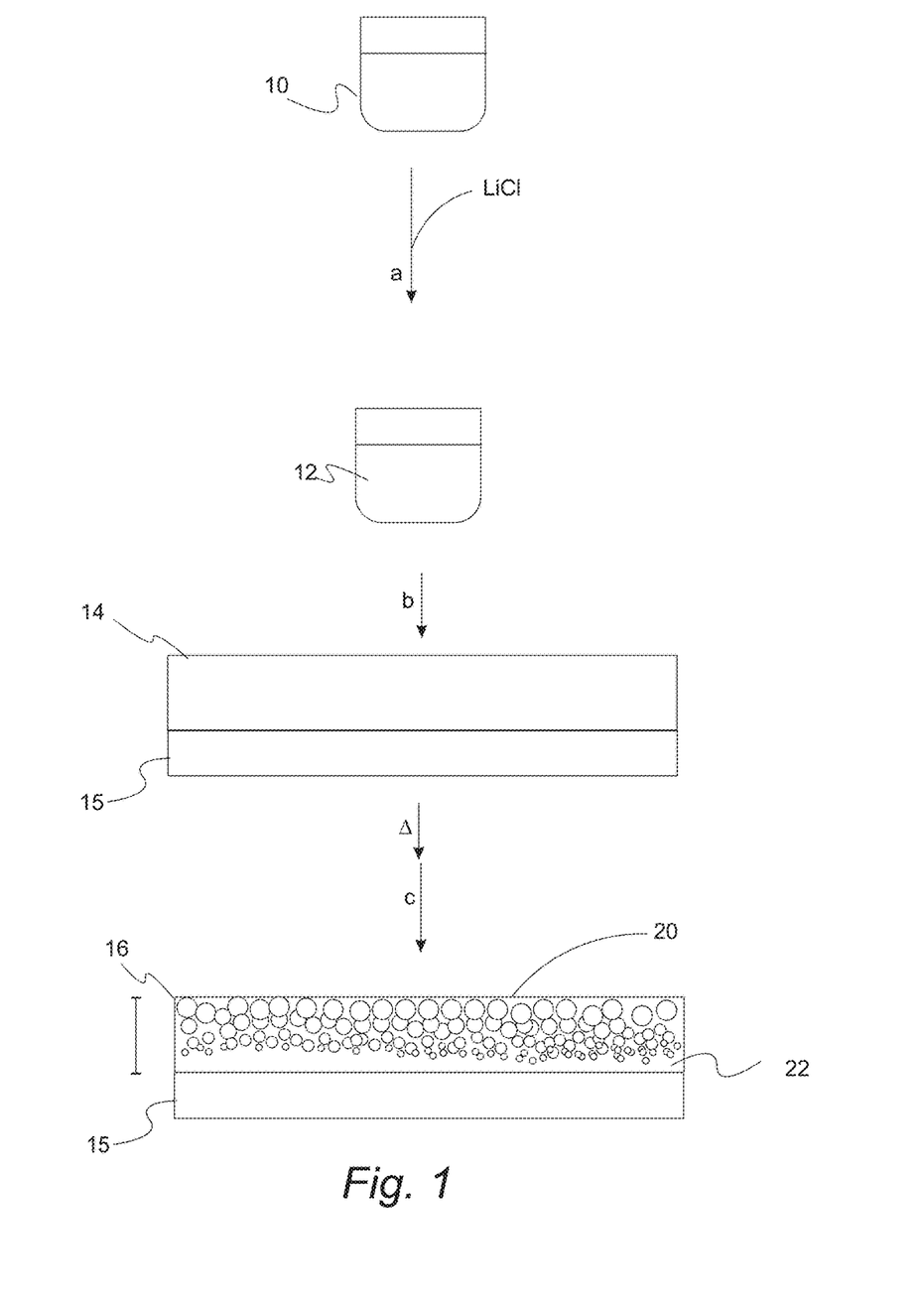
FIG. 1 provides a flowchart illustrating a method for forming a membrane.

With reference to FIG. 1, a flowchart illustrating the formation of a membrane is provided. In step a), a lithium salt is dissolved in a solution 10 which includes an ionomer (i.e., an ion-conducting polymer) having protogenic groups to form modified solution 12. Additional solvent (e.g., $C_{1-4}$ alcohols, water, etc.) may be added to the modified solution if necessary. Modified solution 12 is formed into membrane 14 in step b). In a refinement, a composite membrane is formed by coating modified solution 12 onto a support 15 such as expanded polytetrafluoroethylene. In such variations, the modified solution imbibes into the substrate. Membrane 14 is dried and then contacted with water in step c) to form modified membrane 16 with a plurality of pores therein. Modified membrane 16 (including the support if present) is a generally planar sheet with a thickness $d_1$. The membranes typically have a thickness from about 5 to 100 microns. In a refinement, the membranes have a thickness from about 1 to 50 microns. In another refinement, the membranes have a thickness from about 10 to 30 microns. In a variation, modified membrane 16 includes a gradient of pore sizes along thickness $d_1$, with the pores sizes becoming smaller at levels further removed from surface 20. In a further refinement, modified membrane 16 includes a region 22 which is distant from surface 20 and which does not include any pores. Typically, the pore sizes are less than about 50 microns (i.e., all spatial dimensions less than 50 microns). In a refinement, the pore sizes have spatial dimensions from 1 to 30 microns. In a further refinement, the pore sizes have spatial dimensions from 2 to 20 microns. In yet another refinement, the pore sizes have spatial dimensions from 3 to 10 microns. In a refinement, the membrane or the ionomer is contacted with an acid to form the free acid form of the ionomer. Advantageously, modified membrane 16 is useful in a number of membrane technologies such as humidifier technology, reverse osmosis, battery separator technology, and the like. The free acid form of the membrane has better premeance to water vapor than that of membrane in the salt form and is therefore useful for humidifiers.

Figure 2:
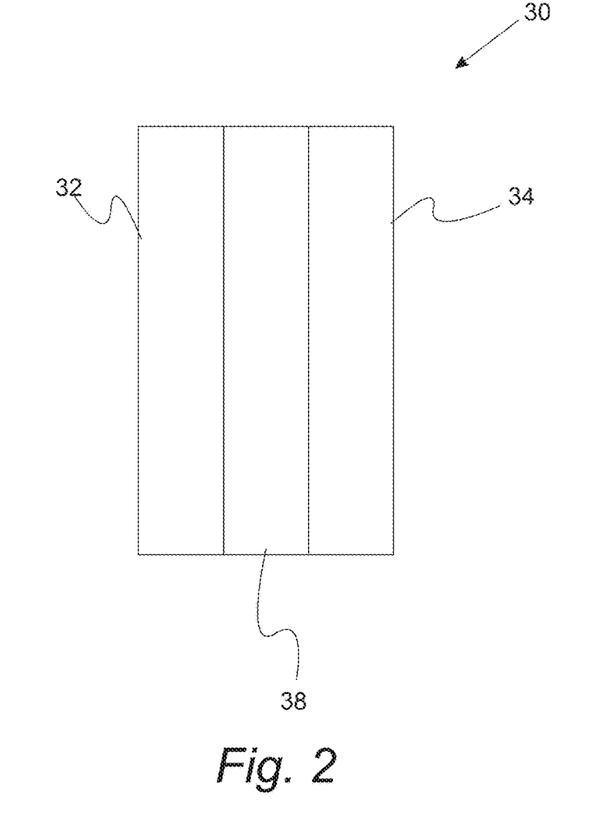
FIG. 2 provides a schematic illustration of a battery that includes a separator formed by a method of the invention.

With reference to FIG. 2, a schematic cross section of a battery assembly incorporating the membrane set forth above is provided. Battery 30 includes anode 32 and cathode 34. Separator 38 is interposed between anode 32 and cathode 34 thereby minimizing electrical shorts between the two electrodes while allowing passages of ions such as lithium ($Li^+$).

Figure 3:
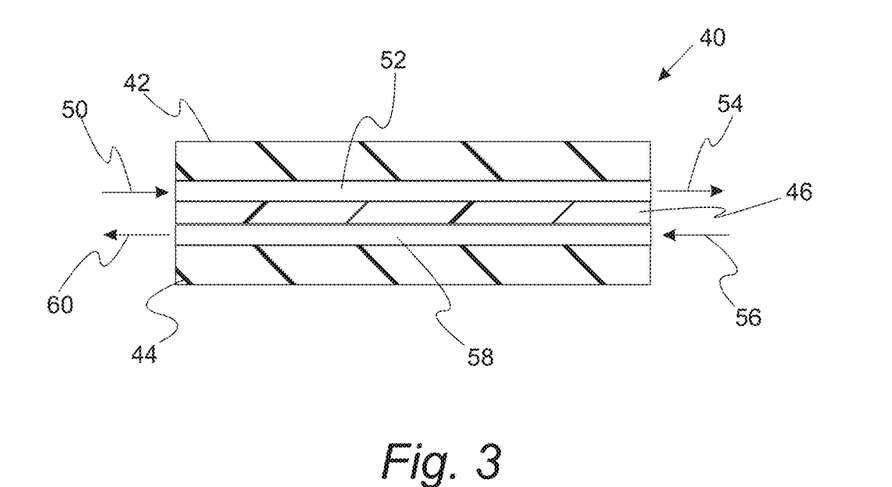
FIG. 3 provides a schematic illustration of a humidifier.

With reference to FIG. 3, a schematic cross section of a membrane humidifier incorporating the membrane set forth above is provided. The membrane humidifier of this embodiment may be used in any application in which it is desirable to transfer water from a wet gas to a dry gas. Membrane humidifier 40 includes first flow field plate 42 adapted to facilitate flow of a first gas to membrane humidifier 40. Membrane humidifier 40 also includes second flow field plate 44 adapted to facilitate flow of a second gas thereto. Polymeric membrane 46 is disposed between the first flow field plate 42 and second flow field plate 44. In a refinement, first flow field plate 42 is a wet plate and second flow field plate 44 is a dry plate. Wet gas 50 (e.g., air) is introduced into channel 52 of flow field plate 42. The output of wet gas 50 is designated by item number 54. Dry gas 56 (e.g., air) is introduced into channel 58 of flow field plate 44 where it is humidified. The humidified gas is designated by item number 60.

Figure 4:
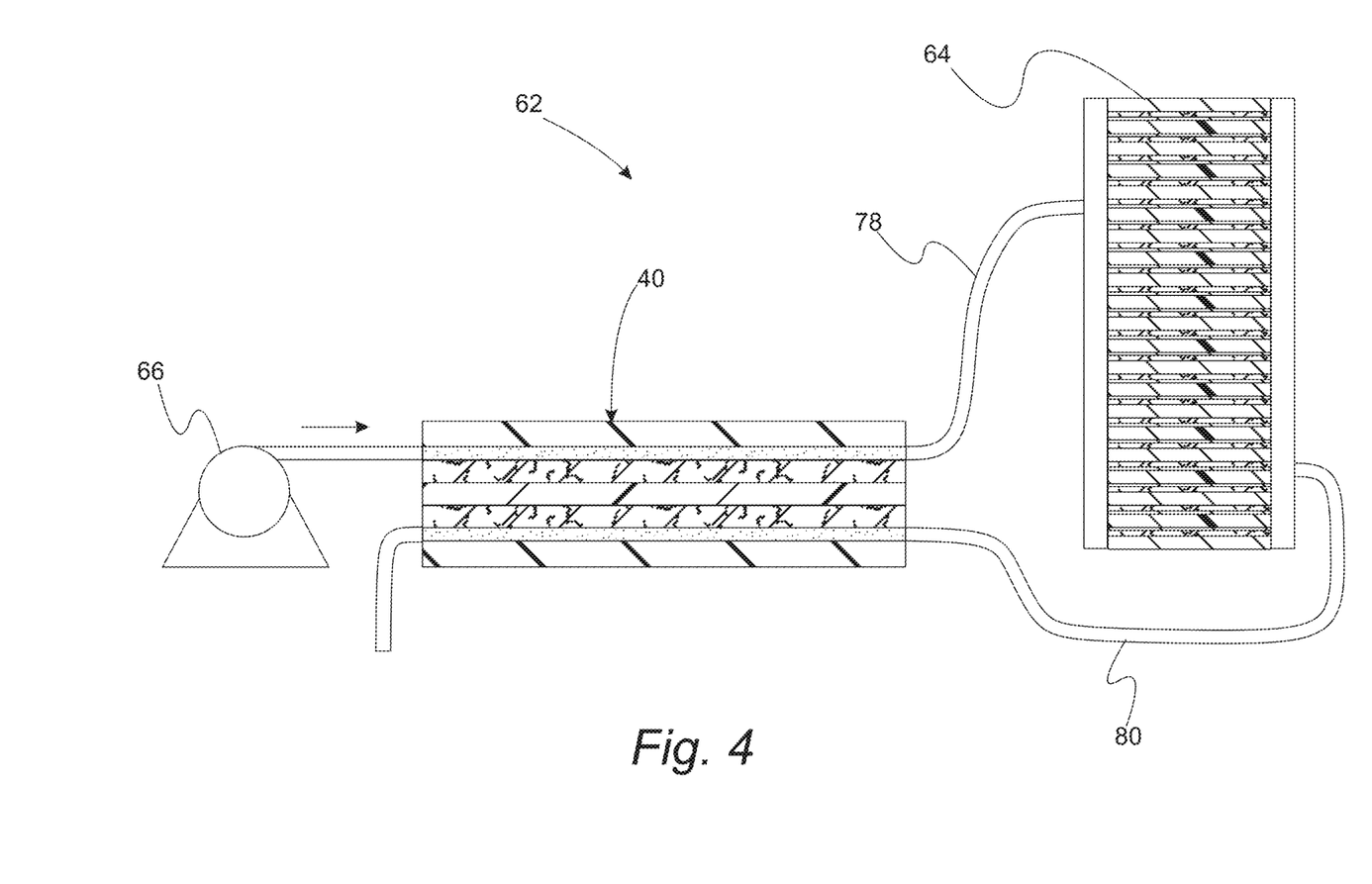
FIG. 4 provides a schematic illustration of a fuel cell system including a membrane humidifier for humidifying a cathode inlet airflow to a fuel cell stack.

With reference to FIG. 4, a schematic of a fuel cell system incorporating a membrane humidifier 40 is provided. Fuel cell system 62 includes fuel cell stack 64. Compressor 66 provides a flow of air to the cathode side of the stack 64 on a cathode input line 78. The flow of air from the compressor 66 is sent through membrane humidifier assembly 40 to be humidified. A cathode exhaust gas is output from the stack 64 on a cathode output line 80. The cathode exhaust gas includes a considerable amount of water vapor and/or liquid water as a by-product of the electrochemical process in the fuel cell stack 64. As is well understood in the art, the cathode exhaust gas can be sent to membrane humidifier 40 to provide the humidification for the cathode inlet air on the line 78.

Figure 5:
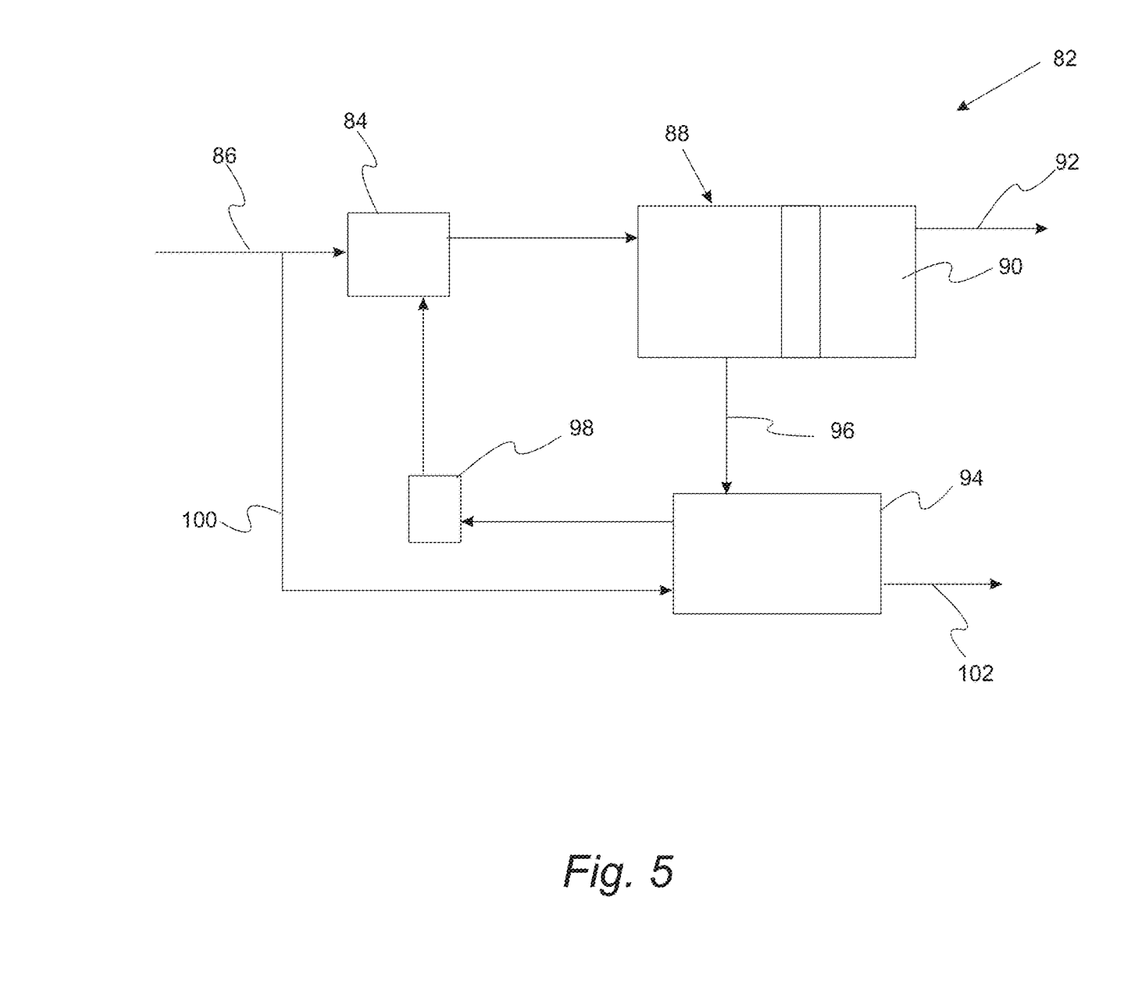
FIG. 5 provides a schematic illustration of a reverse osmosis system that includes separator formed by a method of the invention.

With reference to FIG. 5, a schematic of a reverse osmosis system incorporating the membrane set forth above is provided. Reverse osmosis system 82 includes pump 84 which pumps an input water stream 86 under pressure to reverse osmosis unit 88 which incorporates membrane 90. Membrane 90 is of the membrane design set forth above. Desalinated water 92 is outputted downstream of membrane 90. Reverse osmosis system 82 also includes pressure exchange 94 which circulates a concentrated water stream 96 to pump 84 via circulation pump 98. Pressure exchanger 94 also receives portion 100 of water stream 86 and outputs concentrated water stream 102.

As set forth above, the membrane is formed from an ionomer that includes protogenic groups. Examples of pro- togenic groups include, but are not limited to, —SO$_2$X, —PO$_3$H$_2$, —COX, and the like where X is an —OH, a halogen, or a C$_{1-6}$ ester. In a variation, the ionomer having protogenic groups is a perfluorosulfonic acid polymer (PFSA). In a refinement, such PFSAs are a copolymer containing a polymerization unit based on a perfluorovinyl compound represented by:

CF$_2$=CF—(OCF$_2$CFX$^1$)$_m$—O$_r$—(CF$_2$)$_q$—SO$_3$H where m represents an integer of from 0 to 3, q represents an integer of from 1 to 12, r represents 0 or 1, and X$^1$ represents a fluorine atom or a trifluoromethyl group and a polymerization unit based on tetrafluoroethylene.

In another variation, the ionomer having protgenic groups is a perfluorocyclobutyl-containing (PFCB) ionomer. Suitable PFCB ionomers are disclosed in U.S. Pat. Pub. No. 2007/0099054, U.S. Pat. No. 7,897,691 issued Mar. 1, 2011; U.S. Pat. No. 7,897,692 issued Mar. 1, 2011; U.S. Pat. No. 7,888,433 issued Feb. 15, 2011, U.S. Pat. No. 7,897,693 issued Mar. 1, 2011; and U.S. Pat. No. 8,053,530 issued Nov. 8, 2011, the entire disclosures of which are hereby incorporated by reference. Examples of perfluorocyclobutyl moieties are:

In a variation, the ion-conducting polymer having perfluorocyclobutyl moieties includes a polymer segment comprising polymer segment 1:

E$_0$-P$_1$-Q$_1$-P$_2$        1 wherein:
E$_0$ is a moiety, and in particular, a hydrocarbon-containing moiety, that has a protogenic group such as —SO$_2$X, —PO$_3$H$_2$, —COX, and the like;
P$_1$, P$_2$ are each independently absent, —O—, —S—, —SO—, —CO—, —SO$_2$—, —NH—, NR$_2$—, or —R$_3$—;
R$_2$ is C$_{1-25}$ alkyl, C$_{6-25}$ aryl or C$_{6-25}$ arylene;
R$_3$ is C$_{1-25}$ alkylene, C$_{2-25}$ perfluoroalkylene, C$_{2-25}$ perfluoroalkyl ether, C$_{2-25}$ alkylether, or C$_{6-25}$ arylene;
X is an —OH, a halogen, an ester, or R$_4$ is trifluoromethyl, C$_{1-25}$ alkyl, C$_{2-25}$ perfluoroalkylene, C$_{6-25}$ aryl, or E$_1$; and
Q$_1$ is a fluorinated cyclobutyl moiety.

The following examples illustrate the various embodiments of the present invention.

Those skilled in the art will recognize many variations that are within the spirit of the present invention and scope of the claims.

Figure 6:
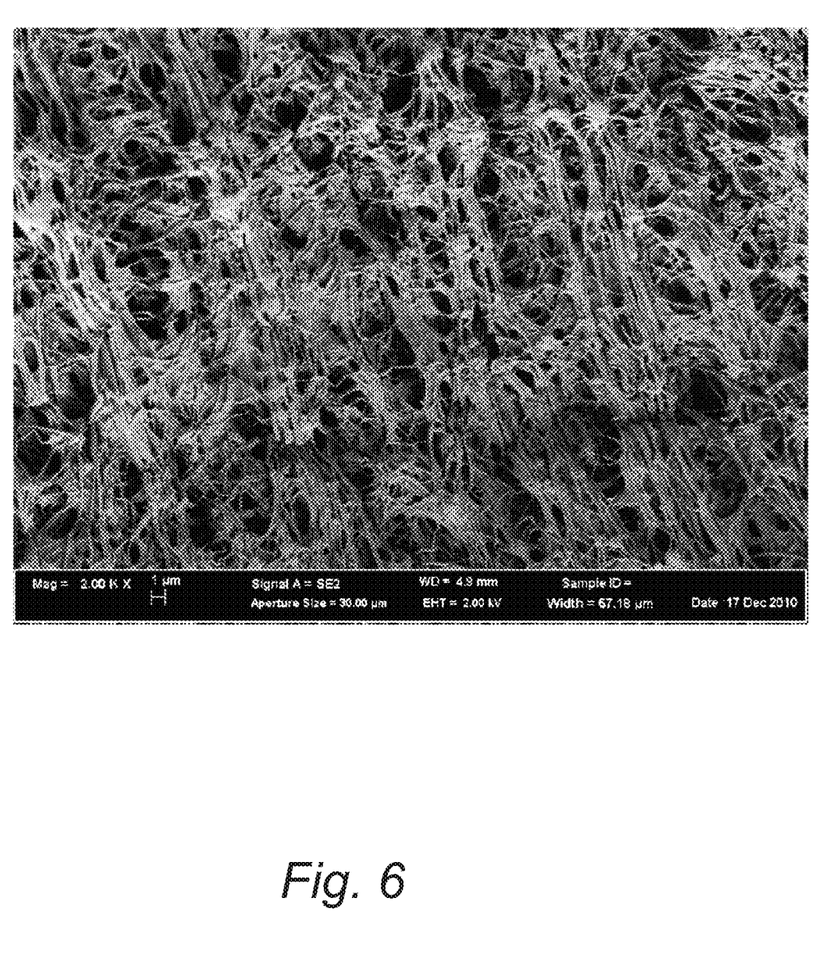
FIG. 6 provides a scanning electron microscopic (SEM) picture of a NAFION® DE2020 composite membrane in the lithium salt form that is useful as a separator in a $Li^+$ ion battery.

Example 1. Preparation of a Lithium Ion Battery Separator with the Li$^+$ Salt of Nafion® and ePTFE Lithium chloride (1 gram) is allowed to dissolve in NAFION® DE2020 (10 grams of a 20 wt. % ionomer solids solution in a 2:3 ratio of water and 1-propanol, DuPont de Nemours) and then more 1-propanol (19 g) is added. This solution is draw-bar coated using a 3-mil Bird applicator (P.E. Gardner Co.) and an Erichsen coater operated at 12.5 mm/second onto a PTFE-Kapton film (American Durofilm) used as a backer-release sheet. Then a support membrane of expanded polytetrafluoroethylene (ePTFE, Ningbo, part number: 061120-3-1 A), stretched on a wooden embroidery frame, is laid on top of the wet coated film. The ionomer imbibes into the ePTFE and the composite is then dried at 80° C. before being allowed to return to 23° C. A 1-mil tape (Lamart Corp. SW100) used as a shim is applied on the top edges of the coated composite, and a second coating of the same ionomer-LiCl solution is applied to the composite using a 3-mil Bird applicator. The composite is again heated to 80° C. until dry and then is heated in a convection oven for 16 hours at 140° C. to anneal the membrane. The membrane is removed from the backer film and immersed in water (2 gallons) for 16 hours. The film is then immersed in lithium chloride solution (1 molar) and titrated to pH 10 with lithium hydroxide (0.1 molar). The membrane is re-immersed in water (2-gallons) with frequent water changes over 24 hours. The resultant membrane has the structure shown in FIG. 6 as determined using scanning electron microscopy.

Figure 7:
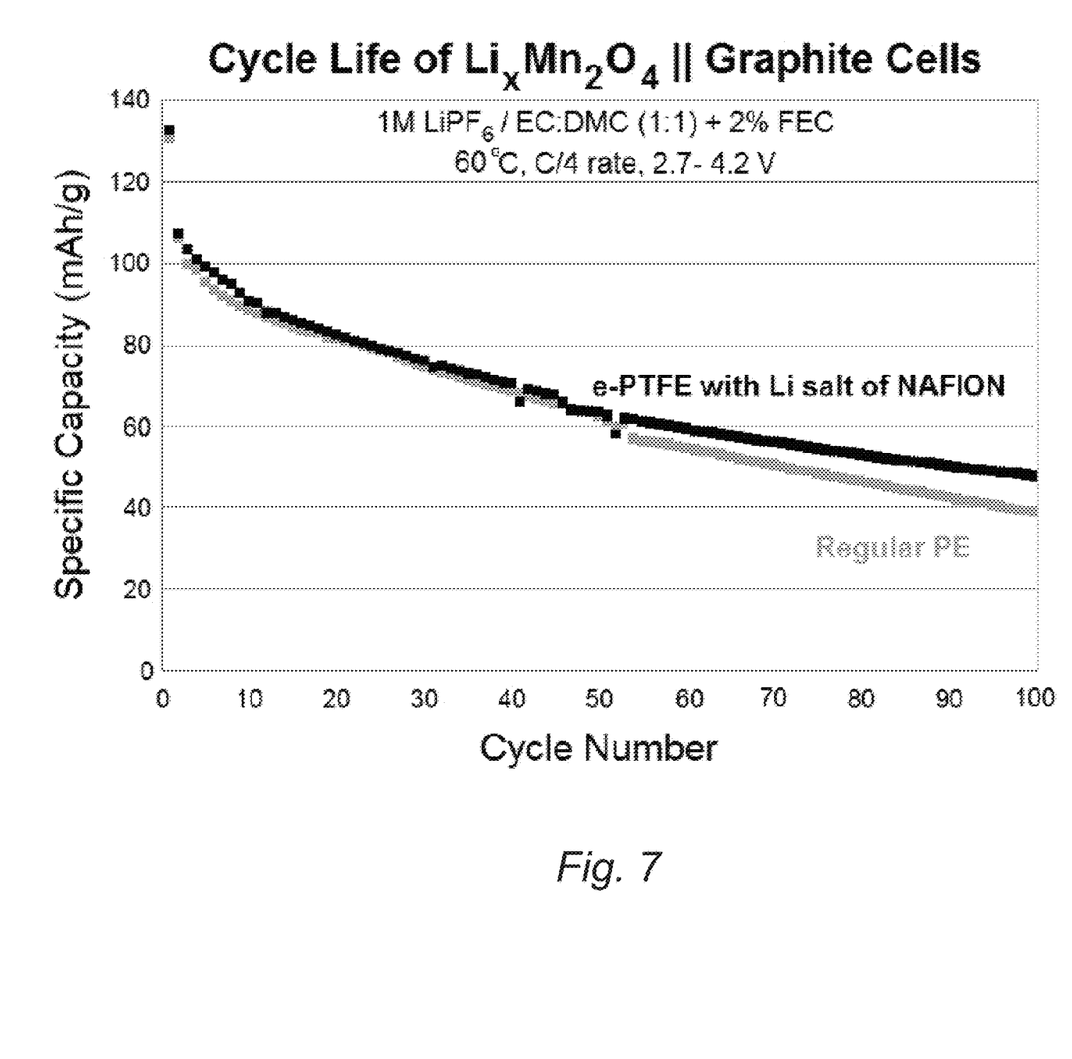
FIG. 7 provides a plot of specific capacity versus cycle number for a $Li^+$ battery using a NAFION® DE2020, ePTFE composite membrane in the lithium salt form.

Cyclic charging and discharging of the lithium batteries made using this separator compare favorably with batteries made using Celgard 2320, Entek and other commercially available battery separators. Advantages to the NAFION® separator include improved, high-temperature stability, strength and durability. A cycling performance curve for the Example 1 membrane is shown in FIG. 7 in which specific capacity is plotted versus cycle number for a Li$^+$ battery using a NAFION® DE2020, ePTFE composite membrane in the lithium salt form, prepared as in Example 1, and is compared with a commercial porous polyethylene battery separator (designated "regular PE").

Example 2. Humidification and Reverse Osmosis Membrane with Nafion® and ePTFE

A membrane is prepared as described in Example 1, except that after annealing at 140° C. for 16 hours and removal from the backer film and immersion in water (2 gallons) for 16 hours, the membrane is converted into the acid form by immersion treatment with 2-molar sulfuric acid (2 liters) at 70° C. for 1 hour. The membrane is re-immersed in water (2-gallons) with frequent water changes over 24 hours until the water washings are greater than pH 6. The resultant membrane is useful for humidification and for water treatment by reverse osmosis.

Figure 8:
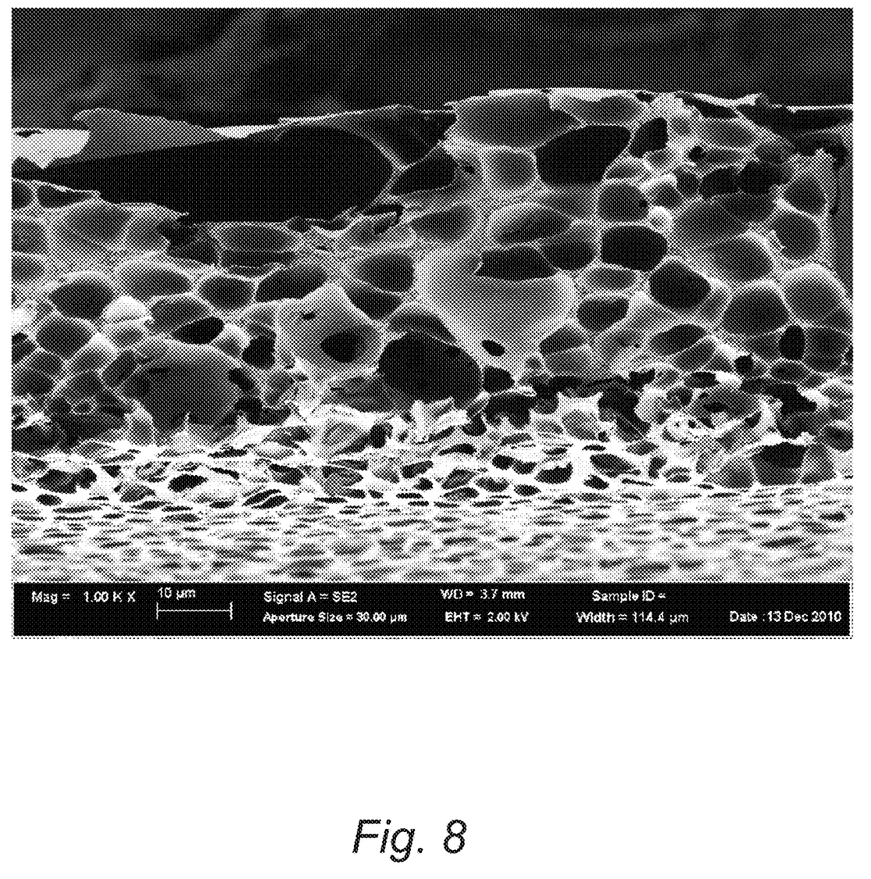
FIG. 8 provides a scanning electron microscopic picture of a NAFION® DE2020 membrane in the lithium salt form that is useful as a separator in a $Li^+$ ion battery.

Example 3. Preparation of a Lithium Ion Battery Separator with the Li$^+$ Salt of Nafion® without ePTFE Lithium chloride (1 gram) is allowed to dissolve in NAFION®DE2020 (10 grams of a 20 wt. % ionomer solids solution in a 2:3 ratio of water and n-propanol, DuPont de Nemours) and then more 1-propanol (19 g) is added. This solution is draw-bar coated using a 3-mil Bird applicator (P.E. Gardner Co.) and an Erichsen coater operated at 12.5 mm/second onto a PTFE-Kapton film (American Durofilm) used as a backer-release sheet. The film is then dried at 80° C. before being allowed to return to 23° C. A 1-mil tape (Lamart Corp. SW100) used as a shim is applied on the top edges of the coated composite, and a second coating of the same ionomer-LiCl solution is applied to the composite using a 3-mil Bird applicator. The composite is again heated to 80° C. until dry and then is heated for 16 hours at 140° C. to anneal the membrane. The membrane is removed from the backer film and immersed in water (2 gallons) for 16 hours. The film is then immersed in lithium chloride solution (1 molar) and titrated to pH 10 with lithium hydroxide (0.1 molar). The membrane is re-immersed in water (2-gallons) with frequent water changes over 24 hours. The resultant membrane has the structure shown in FIG. 8 as determined using scanning electron microscopy. This membrane with a porous structure is useful as a battery separator in lithium ion batteries for electric vehicles.

Example 4. Preparation of a Humidification and Reverse Osmosis Membrane

The membrane prepared in Example 3 is converted to the acid form by treatment with 2-molar sulfuric acid. This membrane is useful in humidifiers and in reverse osmosis water treatments.

Example 5. Preparation of a Humidification and Reverse Osmosis Membrane

A solution of NAFION® DE2020 (20 wt. % solids) is diluted to 10 wt. % solids with 1-propanol and is draw bar coated using a 3-mil Bird applicator (P.E. Gardner Co.) and an Erichsen coater operated at 12.5 mm/second onto a PTFE-Kapton film (American Durofilm) used as a backer-release sheet. The film is dried at 80° C. and is then allowed to return to 23° C. A 1-mil tape (Lamart Corp. SW100) used as a shim is applied to the edges of the coated composite, and a second coating of an ionomer-LiCl solution is applied by draw-bar coating using a 3-mil Bird applicator and an Erichsen coater operated at 12.5 mm/second. [The ionomer-LiCl solution is prepared as described in Example 1 by dissolving lithium chloride (1 gram) in NAFION® DE2020 (10 grams of a 20 wt. % ionomer solids solution in a 2:3 ratio of water and n-propanol) followed by the addition of more 1-propanol (19 g).] The wet composite is again heated to 80° C. until dry and then is heated for 16 hours at 140° C. to anneal the membrane. The membrane is removed from the backer film and immersed in water (2 gallons) for 16 hours. The membrane is converted back into the acid form by immersion in sulfuric acid solution (2 molar). The membrane is re-immersed in water (2-gallons) with frequent water changes over 24 hours. The resultant membrane is useful as a reverse osmosis membrane and a humidification membrane.

Example 6. Preparation of a Humidification and Reverse Osmosis Membrane with ePTFE A solution of Nafion DE2020 (20 wt. % solids) is diluted to 10 wt. % solids with 1-propanol and is draw bar coated using a 3-mil Bird applicator (P.E. Gardner Co.) and an Erichsen coater operated at 12.5 mm/second onto a PTFE-Kapton film (American Durofilm) used as a backer-release sheet. Then a support membrane of expanded polytetrafluoroethylene (ePTFE, Ningbo, part number: 061120-3-1 A), stretched on a wooden embroidery frame, is laid on top of the wet coated film. The ionomer imbibes into the ePTFE and the composite is then dried at 80° C. before being allowed to return to 23° C. A 1-mil tape (Lamart Corp. SW100) used as a shim is applied on the top edges of the coated composite, and a coating of ionomer-LiCl solution is applied to the composite using a 3-mil Bird applicator and an Erichsen coater operated at 12.5 mm/second. [The ionomer-LiCl solution is prepared as described in Example 1 by dissolving lithium chloride (1 gram) in Nafion® DE2020 (10 grams of a 20 wt. % ionomer solids solution in a 2:3 ratio of water and n-propanol) followed by the addition of more 1-propanol (19 g).] The wet composite is heated to 80° C. until dryness and then is heated for 16 hours at 140° C. to anneal the membrane. The membrane is removed from the backer film and immersed in water (2 gallons) for 16 hours. The membrane is converted back into the acid form by immersion in sulfuric acid solution (2 molar). The membrane is re-immersed in water (2-gallons) with frequent water changes over 24 hours. The resultant ePTFE composite membrane is useful as a reverse osmosis membrane and a humidification membrane.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for forming a membrane, the method comprising:
   a) dissolving lithium salt in a solution including an ionomer with protogenic groups to form a modified solution;
   b) forming a membrane from the modified solution;
   c) drying the membrane; and
   d) contacting the membrane with water to form a plurality of pores therein.

2. The method of claim 1 wherein the lithium salt is lithium chloride.

3. The method of claim 1 wherein the pore size varies along the thickness of the membrane.

4. The method of claim 3 wherein the pore size decreases along the thickness of the membrane.

5. The method of claim 4 wherein the membrane has a region substantially free of pores.

6. The method of claim 1 wherein the membrane in step b) is formed by contacting a polymeric support with the modified solution.

7. The method of claim 6 wherein the polymeric support is expanded polytetrafluoroethylene.

8. The method of claim 1 wherein the protogenic groups are selected from the group consisting of —$SO_2X$, —$PO_3H_2$, and COX where X is an —OH, a halogen, or a $C_{1-6}$ ester.

9. The method of claim 1 wherein the ionomer having protogenic groups is a perfluorosulfonic acid polymer.

10. The method of claim 9 wherein the perfluorosulfonic acid polymer is a copolymer containing a polymerization unit based on tetrafluoroethylene and a polymerization unit based on a perfluorovinyl compound represented by:

$$CF_2=CF-(OCF_2CFX^1)_m-O_r-(CF_2)_q-SO_3H$$

where m represents an integer of from 0 to 3, q represents an integer of from 1 to 12, r represents 0 or 1, and $X^1$ represents a fluorine atom or a trifluoromethyl group.

11. The method of claim 1 wherein the ionomer having protogenic groups is a perfluorocyclobutyl-containing polymer.

12. The method of claim 1 further comprising incorporating the membrane into a battery as a battery separator.

13. The method of claim 1 further comprising incorporating the membrane into a humidifier.

14. The method of claim 13 wherein the membrane is contacted with acid to form the free acid form of the ionomer.

15. The method of claim 1 further comprising incorporating the membrane into a reverse osmosis system.

16. The method of claim 1 wherein the membrane is contacted in step d) with a component consisting of water to form the pores.

* * * * *